Dec. 13, 1949  C. C. DAVENPORT  2,490,784
BEARING APPARATUS
Filed April 26, 1946  2 Sheets-Sheet 1
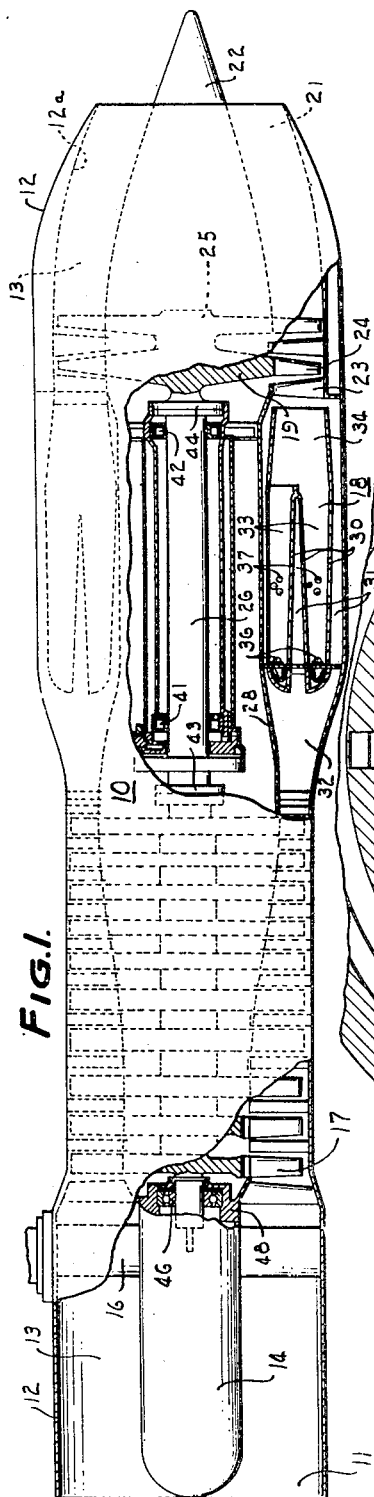
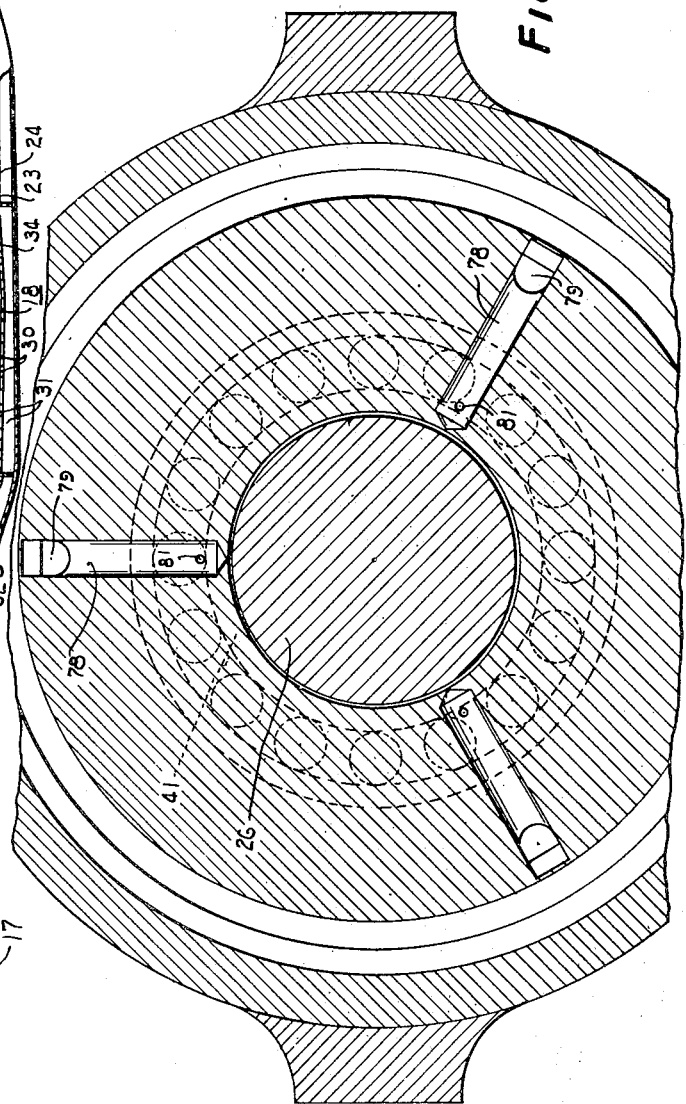
INVENTOR
CHARLES C. DAVENPORT
BY Ralph T. French
ATTORNEY

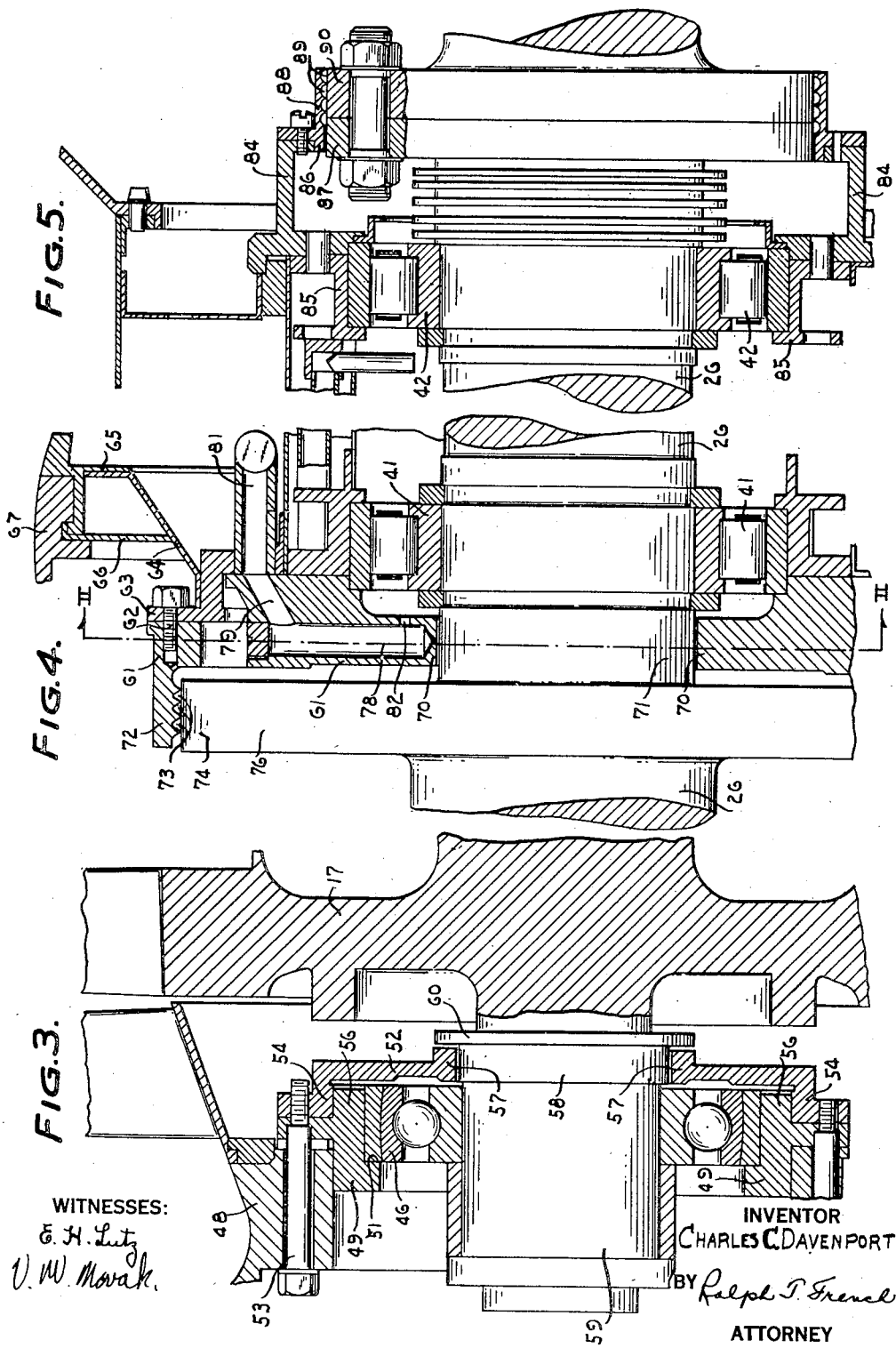

Patented Dec. 13, 1949

2,490,784

UNITED STATES PATENT OFFICE 2,490,784

BEARING APPARATUS

Charles C. Davenport, Media, Pa., assignor to Westinghouse Electric Corporation, East Pittsburgh, Pa., a corporation of Pennsylvania Application April 26, 1946, Serial No. 665,172

1 Claim. (Cl. 253—39)

This invention relates to rotating machine parts, more particularly to bearings therefor, and has for an object to provide an improved emergency bearing.

Another object of the invention is to provide an emergency bearing disposed adjacent a ball bearing or a roller bearing to temporarily support the rotating part until the machine containing the rotating part can be shut down.

The present invention, although not limited thereto, is particularly adapted for use with a gas turbine power plant of the type employed on aircraft to drive the propeller or an electric generator, or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and turbine for heating the compressed air and which discharges the hot gases at a suitable temperature and pressure to the turbine. The spent gases on leaving the turbine are discharged through a nozzle provided at the rear of the casing and may aid in propelling the aircraft.

Therefore, another object of the invention is to provide, in a gas turbine power plant, whose turbine shaft is journalled in ball or roller bearings and whose turbine blades have small running clearance with respect to the turbine casing, emergency bearings disposed adjacent said ball or roller bearings and adapted, upon failure of the latter bearings, to carry the load until the plant can be shut down, thereby preventing rubbing of the turbine blades on the casing.

A further object of the invention is to provide an emergency bearing adapted to carry the radial and thrust load temporarily in the event of failure of the regular ball or roller bearing, together with means associated with said emergency bearing to indicate to the operator that the emergency bearing is carrying the load.

These and other objects are effected by the invention as will be apparent from the following description and claim taken in connection with the accompanying drawings, forming a part of this application, in which:

Fig. 1 is a side elevational view of a gas turbine power plant incorporating the features of the present invention, a portion of the outer casing and part of the inner structure being broken away to better illustrate the novel features;

Fig. 2 is an enlarged fragmentary sectional view, taken along the line II—II of Fig. 4, looking in the direction indicated by the arrows; and Figs. 3, 4 and 5 are enlarged fragmentary longitudinal sectional views of the forward, intermediate, and rearward bearings, respectively, of the power plant shown in Fig. 1.

The power plant shown in Fig. 1, and generally indicated 10, is adapted to be mounted in or on the fuselage or wing of an aircraft, with the left or inlet end 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tailpiece 22, the latter being mounted concentrically in the casing 12a and cooperating with the latter to provide the propulsion nozzle.

Air enters at the intake end 11 and flows substantially straight through the plant, passing through the compressor 17, where it is compressed, and into the combustion apparatus 18, where it is heated. The hot gases, comprising the products of combustion and excess air are heated by the combustion, on leaving the combustion apparatus are directed by suitable guide vanes or nozzles 23 against the blades 24 carried by the turbine disc 25, and then are discharged through the propulsion nozzle 21 to propel the aircraft.

By reference to Fig. 1, it will be noted that the compressor and turbine rotors are interconnected by means of a shaft 26 supported by bearings which will be described in more detail later, and enclosed by an inner casing structure generally indicated 28, which protects the shaft and bearings from high temperatures and also defines a portion of the annular air flow passage 13 in which the combustion apparatus 18 is mounted.

In order to maintain the combustion apparatus and the outer casing structure of small maximum diameter, the combustion apparatus is divided by wall structure 30 into air spaces 31 open to the discharge end of a diffuser passage 32 leading from the compressor, and which overlap burner spaces 33 open to a passage 34 leading to the turbine guide vanes 23. Atomized fuel is supplied to the forward end of the burner spaces by nozzles 36, the burner spaces also being provided with suitable ignition means (not shown). The dividing wall structure 30 has openings 37 therein providing for entry into the burner spaces 33 of compressed air from the overlapping air spaces 31, the entering air supporting combustion of fuel and mixing with the hot products of combustion to provide a motive fluid comprising a mixture of air and products of combustion of suitable temperature for driving the turbine.

As illustrated in Fig. 1, the shaft 26, interconnecting the turbine and compressor rotors, is journaled in a pair of roller bearings 41 and 42, the former being disposed adjacent the shaft coupling 43 at the compressor end and the latter being adjacent the coupling 44 at the turbine end. A third bearing 46, of the ball type, supports the forward end of the compressor rotor, these three bearings constituting the entire normal support for the compressor and turbine rotors. It will be noted that the turbine rotor is supported in overhung relation with respect to the bearing structure.

Referring now to Figs. 1 and 3, wherein the ball bearing 46 is shown, the reference character 48 indicates a bearing housing formed integral with, or secured to, and supported from the casing 12 by the guide vanes 16. A bearing support ring 49 takes both radial and end thrust, the latter being taken through the shoulder 51, integral with the ring 49. Both the support ring 49 and a wear ring 52, constituting an emergency bearing, are secured to the bearing housing 48 by a plurality of studs 53. The wear ring 52 has an axially-extending shoulder 54 fitting closely on the mating shoulder 56 of the supporting ring 49. The innermost portion of the wear ring 52 is formed as an annular foot 57, having a close clearance, for example, five to ten thousandths of an inch, with an opposed surface 58 on the shaft 59 normally supported by the ball bearing 46. The ball bearing usually allows no more than one thousandth of an inch of radial play, with the result that normally there will be no contact between the foot 57 of the wear ring 52 and the opposed shaft surface 58. However, should the ball bearing 46 fail, the foot 57 of the wear ring 52 will act as a journal for the shaft, at 58, and take thrust from the flange 60 or from the inner race of ball bearing 46, thereby serving as an emergency radial and thrust bearing, affording the operator of the power plant an opportunity to shut down the plant without damage to the compressor or turbine blading. It should be noted that the normal running clearance between the blading of the compressor and turbine and the adjacent stationary and moving parts is greater than the added play present when the emergency bearing is carrying the shaft, so that rubbing of the blading will not occur.

In Fig. 4, there is illustrated a modified wear ring 61 adapted to serve as an emergency bearing in the event of failure of the intermediate roller bearing 41, adjacent which it is positioned. The wear ring 61 is secured by suitable means, such as studs 62, to supporting structure 63, 64, 65, 66 and 67. The wear ring 61 has a normal running clearance, at 70, with the portion 71 of the shaft 26, in the order of five or ten thousandths of an inch, so that as long as the roller bearing 41 functions, the wear ring and shaft are out of contact. Upon failure of the roller bearing 41, the wear ring will support the shaft at 70—71, thereby preventing damage to the turbine and compressor blading, in the same manner as the previously-described wear ring (Fig. 3).

Preferably, the wear ring 61 (Figs. 4 and 5) includes a cylindrical flange 72 having grooves 73 formed in the inner surface thereof to provide a labyrinth seal with respect to the adjacent peripheral surface 74 of the flange 76, extending radially from the shaft 26.

The wear ring 61 also is provided with a plurality of radial passages 78 communicating through passages 79 with oil supply lines 81. Adjacent the inner ends of the radial passages 78 are discharge openings 82 for discharge of oil under pressure onto the bearing 41 (see Fig. 2).

In Fig. 5, a wear ring 85, of yet another construction, provides an emergency substitute for the roller bearing 42 upon failure of the latter. In this arrangement, the wear ring 84 is bolted or otherwise secured to a bearing support ring 85 and includes an annular foot portion 86, acting as a bearing for the shaft 26 at the periphery of the coupling flange 87. Preferably, the wear ring foot portion 86 has an axial extension 88 internally grooved, at 89, to provide a labyrinth seal with respect to the periphery of the coupling flange 90.

While the invention has been shown in several forms, it will be obvious to those skilled in the art that it is not so limited but is susceptible of various other changes and modifications without departing from the spirit thereof.

What is claimed is:

In apparatus including a rotor, a stator, blading carried by said rotor and having running clearance with respect to said stator, and a bearing for supporting said rotor and comprising inner and outer races and an annular series of rollable members disposed therebetween; an inwardly-extending flange like member supported by the stator in axial alignment with said bearing and close to the latter, said member having an inner annular bearing surface surrounding an annular surface on the rotor with both of said surfaces concentric about the axis of rotation of said rotor, said surfaces having a normal running clearance greater than the play in said bearing and less than the running clearance of said blading with respect to the stator, whereby upon failure of said bearing said member may support the rotor and maintain a running clearance between the blading and the stator, and said member having a plurality of passages therein for flow of lubricant, said passages terminating in discharge ports in the side of the member adjacent bearing for directing lubricant against the latter.

CHARLES C. DAVENPORT.

REFERENCES CITED

The following references are of record in the file of this patent:

UNITED STATES PATENTS

| Number | Name | Date |
|---|---|---|
| 882,846 | Sachs | Mar. 24, 1908 |
| 1,175,415 | Egbert | Mar. 14, 1916 |
| 2,373,860 | Torresen | Apr. 17, 1945 |
| 2,423,973 | Halford | July 15, 1947 |